W. F. ROSSMAN,
Lamp Stove.
No. 80,508.
Patented July 28, 1868.
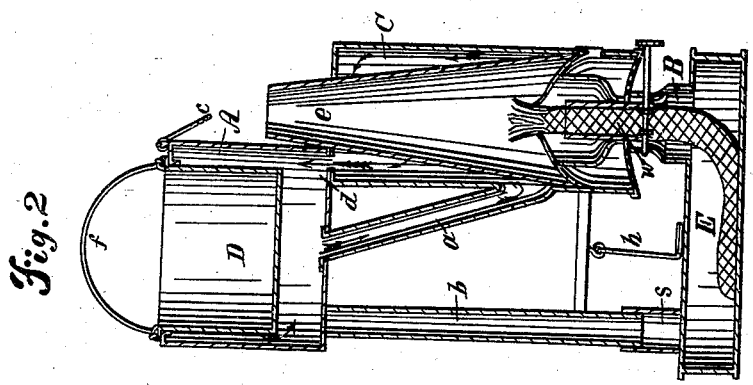
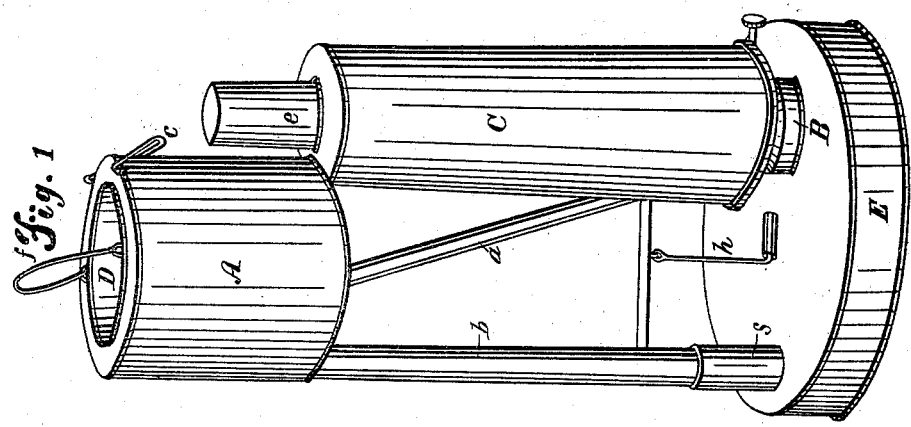

United States Patent Office.

WILLIAM F. ROSSMAN, OF HUDSON, NEW YORK.

Letters Patent No. 80,508, dated July 28, 1868.

KEROSENE-LAMP BOILER.

*The Schedule referred to in these Letters Patent and making part of the same.*

Be it known that I, WILLIAM F. ROSSMAN, of the city of Hudson, in the county of Columbia, and State of New York, have invented a new and useful Kerosene-Lamp Boiler; and I do hereby declare that the following is a full, clear, and exact description of the construction and operation of the same, reference being had to the annexed drawings, making a part of this specification, in which—

Figure 1 is a perspective view of the invention.

Figure 2, a vertical section of the same.

The nature of my invention consists in employing the heat of a kerosene-burner for the purpose of boiling water, by an arrangement similar to that of the water-back to ranges and cooking-stoves.

To enable those skilled in the art to make and use my invention, I will proceed to describe its construction and operation.

I construct my lamp-boiler by providing it with a hollow base, E, of metal or glass, of some convenient form, circular, square, or elliptical, to serve as the receptacle of the oil for supplying the burner.

On this base, and at or near one end thereof, is inserted a kerosene-burner, B. This burner is provided with a metallic chimney, $e$, which is surrounded and enclosed by a metallic case or cylinder, soldered or otherwise made water-tight, forming the cylinder-boiler C.

On the top of this boiler, C, I place the reservoir or kettle A, extending or lapping over the top of the boiler only far enough for a communication between the two by means of and through the aperture $d$.

From the bottom of the reservoir A another aperture communicates with the tube or pipe $a$, which conducts the cold water into the bottom of the boiler C.

The leg or support $b$ is attached to the bottom of the reservoir or kettle A, and rests on the base, E, or in the socket S, the latter being attached to the top of the base.

In the reservoir or kettle A is suspended the kettle D, which, when not required, may be removed. This inner or suspended kettle D is particularly useful when the whole is employed as a glue-kettle, for keeping glue in condition to be used at all times, and at all places where the work may require it. So also is it useful as a nursery or sick-room cooking-kettle.

As a barber's kettle or boiler, where hot water only is required, it is used without the kettle D. For this last-mentioned use, in some cases, and wherever a larger quantity of hot water is required than can be provided with one burner, I contemplate employing two on one and the same base, E, the other parts of the apparatus being constructed and arranged as for the single burner, except that the kettle A would be made somewhat larger.

The handle $c$ is used to carry the whole device, being placed at or near the balancing or centre-line of suspension.

$f$ is the handle of the kettle D.

The construction having been described, the operation will next be explained.

The cold water being put into the reservoir or kettle A, passes through the tube $a$ down into the boiler C, and around the chimney $e$. The lamp being now lighted through an aperture in the front side of the chimney, which aperture is opened and closed at pleasure, by means of a slide or cover, the metallic chimney $e$ becomes heated, whereby the temperature of the water in the boiler C is elevated so as to begin to rise up through the aperture $d$, the cold water at the same time descending through the tube $a$, thus moving in a circuit from the reservoir A down into the boiler C, where, becoming heated, it thence rises up through the aperture $d$ into the reservoir or boiler A again, until the water is not only all heated, but boils, and boils sufficiently to cook anything required in kettle D.

By this arrangement, water is heated more rapidly, more economically, and to a higher degree, than by any other device now in use. There is no smoke from the burner, B, to coat and encrust the inside of the chimney $e$, and thus destroy the effect of the heat and annoy the operator or the occupants of the room where it is used, which are serious objections to all other lamp-kettles or boilers.

What I claim as my invention, and desire to secure by Letters Patent of the United States, is—

1. The combination and arrangement of reservoir or kettle A, tube $a$, boiler C, and aperture $d$, when employed in connection with a kerosene or fluid-lamp, substantially as and for the purposes described.

2. The combination and arrangement of burner B and chimney $e$ with boiler C, when the latter is connected with the reservoir or kettle A, substantially in the manner and for the purposes set forth.

WM. F. ROSSMAN.

Witnesses:
    JOS. D. FULLER,
    SAML. J. RICHMOND.